(12) United States Patent
Seitz et al.

(10) Patent No.: US 7,594,339 B2
(45) Date of Patent: Sep. 29, 2009

(54) SENSOR MODULE FOR A PROBE OF A TACTILE COORDINATE MEASURING MACHINE

(75) Inventors: Karl Seitz, Oberkochen (DE); Roland Roth, Waldstetten (DE); Walter Dominicus, Koenigsbronn (DE); Wolfgang Strauss, Staig (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 12/017,571

(22) Filed: Jan. 22, 2008

(65) Prior Publication Data

US 2008/0172897 A1 Jul. 24, 2008

Related U.S. Application Data

(63) Continuation of application No. PCT/EP2006/006603, filed on Jul. 6, 2006.

(30) Foreign Application Priority Data

Jul. 26, 2005 (DE) ........................ 10 2005 036 126

(51) Int. Cl.
  G01B 7/012 (2006.01)
  G01B 5/012 (2006.01)
(52) U.S. Cl. ........................................... 33/559; 33/503
(58) Field of Classification Search ............... 33/503, 33/556, 557, 558, 559, 560, 561, 572
See application file for complete search history.

(56) References Cited

U.S. PATENT DOCUMENTS

| | | | | |
|---|---|---|---|---|
| 4,910,879 A | * | 3/1990 | Golinelli et al. | 33/832 |
| 5,111,592 A | * | 5/1992 | Aehnelt et al. | 33/561 |
| 5,209,131 A | * | 5/1993 | Baxter | 73/865.8 |
| 6,430,833 B1 | * | 8/2002 | Butter et al. | 33/559 |
| 6,789,327 B2 | | 9/2004 | Roth et al. | |
| 6,886,265 B2 | * | 5/2005 | Fracheboud et al. | 33/559 |
| 2004/0118000 A1 | * | 6/2004 | Roth et al. | 33/556 |
| 2006/0010702 A1 | | 1/2006 | Roth et al. | |

(Continued)

FOREIGN PATENT DOCUMENTS

DE    32 38 951 A1    4/1984

(Continued)

OTHER PUBLICATIONS

Thomas Kleine-Besten et al.; Miniaturisierter 3D-Tastsensor für die Metrologie an Mikrostrukturen; 1999; pp. 490-495.

(Continued)

*Primary Examiner*—R. A. Smith
(74) *Attorney, Agent, or Firm*—Harness, Dickey & Pierce, P.L.C.

(57) ABSTRACT

A sensor module for a probe of a tactile coordinate measuring machine has a stationary module base which defines a first measurement plane. The sensor module has a support, which is moveable relative to the module base, for holding a stylus. At least one deformable connecting element movably interconnects the support and the module base. The connecting element has at least a first and a second deformable material layer which, perpendicular to the first measurement plane, are arranged offset with respect to each other. In a preferred embodiment, the sensor module is made from two single-layer module parts arranged above and attached to one another.

24 Claims, 4 Drawing Sheets

U.S. PATENT DOCUMENTS

| | | |
|---|---|---|
| 2007/0089313 A1 | 4/2007 | Seitz et al. |
| 2007/0180722 A1 | 8/2007 | Seitz et al. |

FOREIGN PATENT DOCUMENTS

| | | |
|---|---|---|
| DE | 196 23 600 A1 | 1/1997 |
| DE | 196 41 720 A1 | 4/1998 |
| DE | 101 08 774 A1 | 9/2002 |
| DE | 103 14 304 A1 | 8/2004 |
| DE | 10 2004 020 996 A1 | 11/2005 |
| EP | 0 572 800 A1 | 12/1993 |
| EP | 1 400 776 A1 | 3/2004 |
| GB | 2 302 588 A | 1/1997 |
| WO | WO 00/23778 A1 * | 4/2000 |
| WO | WO 02/090877 A2 | 11/2002 |
| WO | 2006/010395 A3 | 2/2006 |

OTHER PUBLICATIONS

Marc Vermeulen; High Precision 3D-Coordinate Measuring Machine; Sep. 1999; 329 pages.

* cited by examiner

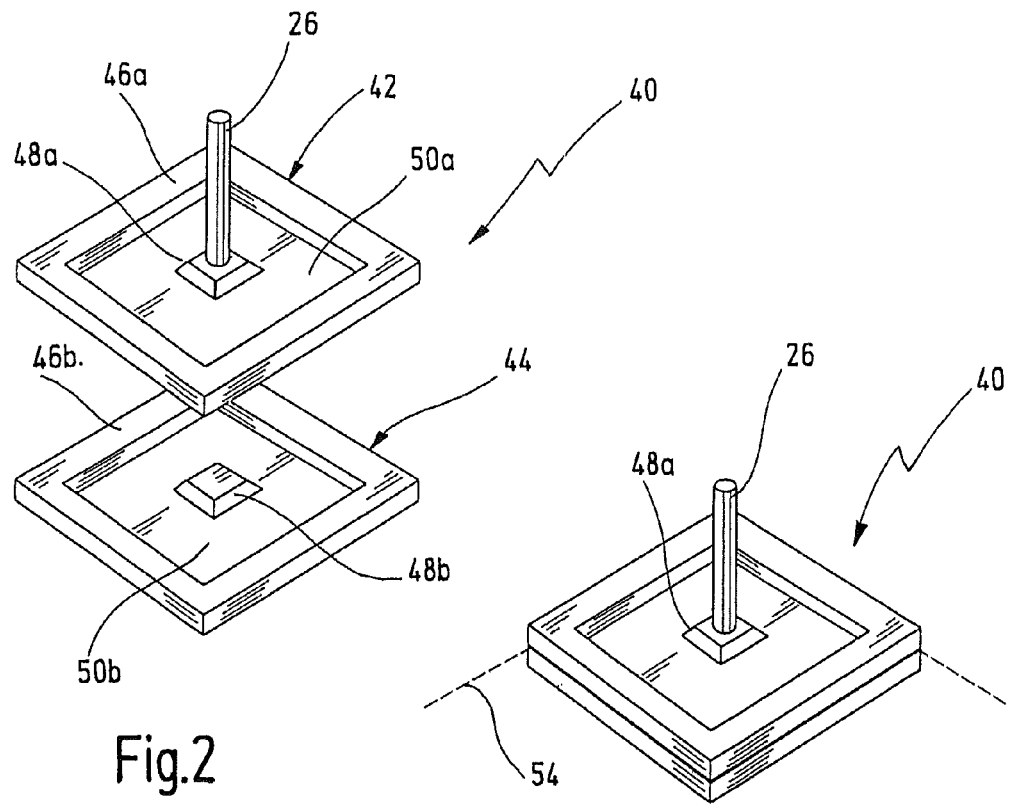
Fig.2
Fig.3
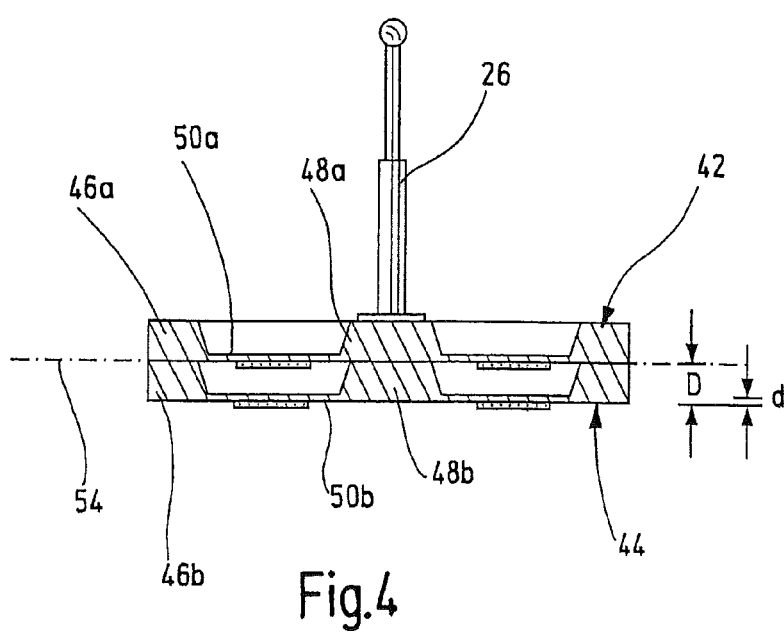
Fig.4

SENSOR MODULE FOR A PROBE OF A TACTILE COORDINATE MEASURING MACHINE

CROSS REFERENCES TO RELATED APPLICATIONS

This application is a continuation of international patent application PCT/EP2006/006603, filed on Jul. 6, 2006 designating the U.S., which international patent application has been published in German language and claims priority from German patent application DE 10 2005 036 126.9, filed on Jul. 26, 2005. The entire contents of these priority applications are incorporated herein by reference.

BACKGROUND OF THE INVENTION

The present invention relates to sensor modules for the probe of a tactile coordinate measuring machine. More particularly, the invention relates to sensor modules having a stationary module base and a moveable support for holding a stylus, with a deformable connecting element interconnecting the support and the module base.

Coordinate measuring machines are typically used to measure the object shape of a measurement object with high precision. For example, the object shape of a workpiece produced by machine may be checked in the course of quality control. For the measurement process, the probe of the coordinate measuring machine is moved toward the measurement object by means of an appropriate movement mechanism until the stylus touches a desired measurement point on the measurement object. The spatial coordinates of the measurement point can then be determined from the position of the probe and from the relative position of the stylus with respect to the probe.

Usually, the stylus is movably suspended on the probe via spring mechanisms and/or plain or roller bearings. Plunger coils or Hall sensors, for example, are used in order to detect the deflections of the stylus relative to the probe. Such "conventional" probe kinematics are several centimeters in size. By contrast, DE 101 08 774 A1 describes a sensor module for a miniaturized probe in an exemplary embodiment. The sensor module comprises a silicon monocrystal, and the structure of the module was fabricated by etching from a solid silicon body. The edge length of the entire sensor module is only 6 mm, while the profile thickness of the module base is 0.5 mm. The deformable connecting element via which the likewise miniaturized stylus is connected to the module base comprises silicon webs with a thickness of approximately 30 μm that have been left standing upon complete etching of the solid body. When the stylus is deflected, the webs are twisted, and this can be detected by means of strain sensors. Owing to the miniaturization and the fragile design, this sensor module is the basis of a new generation of probes for tactile coordinate measuring machines by means of which very accurate measurements on microstructures are rendered possible because of the small dimensions and deflections.

The fundamental concept of such a sensor module for a tactile probe is disclosed in an article by Kleine-Besten et al. entitled "Miniaturisierter 3D-Tastsensor für die Metrologie an Mikrostrukturen" ["Miniaturized 3D probe sensor for metrology of microstructures"], which appeared in the German journal "tm-Technisches Messen" ["tm-Technical measurement"], issue December 1999, pages 490-495. This article describes investigation results on a miniaturized sensor module of this kind, wherein, in contrast to the exemplary embodiment from DE 101 08 774 A1, the support for holding the stylus (the so-called "boss") is held on the module base by a solid membrane. The use of individual webs for holding the boss, as described in DE 101 08 774 A1, is mentioned in the article as a prospect for matching the bending stiffnesses of the module in the three spatial directions x, y, z with respect to one another. This is because the investigation of the sensor module with a solid membrane has shown that the bending stiffnesses when the stylus is deflected in a plane parallel to the module base (x-direction or y-direction) are considerably less than when it is deflected at right angles to the module base (z-direction).

Securing the boss or stylus to the module base by means of webs already leads to an improved matching of the bending stiffnesses. However, there are still considerable difficulties when measurement processes in which the probe is guided in continuous contact with the measurement object are to be carried out (what is called scanning). For such complex measurement processes, it is still problematic to exactly determine the deflection in the z-direction, despite the matching of the bending stiffnesses already achieved.

A probe having a miniaturized sensor module is also disclosed in DE 103 14 304 A1 and WO 2004/068068 having the same priority date. However, these publications relate to the mechanical fastening of the fragile sensor module to a probe. The problem of different bending stiffnesses is not a topic here.

In an older patent application (not a prior publication) of the present applicant (PCT/EP2005/005622), a sensor module of the type mentioned at the beginning is described, wherein the webs between the module base and the stylus support (boss) are designed with a cross section of varying material thickness. This implementation leads to an improved matching of the bending stiffnesses such that scanning measurements can be carried out relatively well. However, the bending stiffnesses in the x-/y-direction and z-direction are still not identical with this solution. Moreover, the production of this novel sensor module requires very fine etching structures that must be executed with high accuracy, and this constitutes a challenge of production engineering.

SUMMARY OF THE INVENTION

Against this background, it is an object of the present invention to provide an alternative sensor module for measurements on microstructures, wherein the bending stiffnesses in the three spatial directions are matched to one another as well as possible.

According to one aspect of the present invention, this object is achieved by a sensor module for a probe of a tactile coordinate measuring machine, comprising a stationary module base which defines a first measurement plane, comprising a support moveable relative to the module base for holding a stylus, and comprising at least one deformable connecting element which movably interconnects the support and the module base, wherein the connecting element has at least a first and a second deformable material layer which, perpendicular to the first measurement plane, are arranged offset with respect to each other.

According to another aspect, this object is achieved by a multilayer sensor module for a probe of a tactile coordinate measuring machine, the sensor module comprising at least two module parts mounted on and secured to one another, with each module part having a module base in the form of a frame and a stylus support arranged inside the frame and connected to the frame via a deformable material layer, wherein the two module parts are connected to one another both in the area of the frames and in the area of the stylus support, wherein the material layers are arranged at a mutual spacing from one another, and wherein each module part consists of a semiconductor material, with each material layer being integrally formed between the frame and the stylus support.

The novel sensor module thus has a design with at least two material layers, which are arranged at a different "level" perpendicular to the first measurement plane. The at least two material layers will advantageously lie parallel to one another in the state of rest of the sensor module. In preferred embodiments, the at least two material layers are arranged with a detectable spacing from one another.

Investigations by the applicant have shown that the bending stiffness of the connecting element is raised in the z-direction by a factor that approximately corresponds to the number of the material layers arranged in a mutually offset fashion. The bending stiffness in the x-direction or y-direction varies, in contrast, as a function of the geometric arrangement and the geometric dimensions of the at least two material layers. Since the bending stiffnesses in the x-/y-directions and z-direction can therefore be influenced differently, it is possible to achieve a matching of the bending stiffnesses in the various directions. In a particularly simple embodiment, it is already possible to achieve a matching when two "conventional" sensor modules, such as known from the article by Kleine-Besten et al., are arranged one above the other, with the module bases (frames) of the individual modules, and preferably also the stylus supports, being interconnected. In this case, the membranes of the individual modules constitute a double-layer, deformable connecting element in which the stiffness in the z-direction is approximately doubled as against the individual module, while the bending stiffness in the x-/y-directions is a function of the vertical spacing of the membranes and of the membrane thickness. As an alternative, however, a sensor module of multilayer design can also be implemented by means of a unipartite module base.

The novel sensor module enables a matching of the bending stiffnesses in the various spatial directions. In contrast to the solution described in later published PCT/EP2005/005622, the individual material layers do not require a varying cross-sectional profile, although this is certainly possible for further matching of the bending stiffnesses. The novel sensor module therefore provides an alternative that can be implemented more easily in terms of production engineering, at least in some preferred embodiments.

In a preferred refinement, the first and the second material layers are arranged with a mutual spacing from one another.

The investigations by the applicant have shown that the bending stiffness in the x-/y-directions is raised in a fashion approximately proportional to the ratio D/d, with D being the vertical spacing of the at least two material layers, while d specifies the thickness of the individual material layers. The bending stiffness in the x-/y-directions can thus be influenced in a very simple manner by providing a detectable spacing between the material layers.

In a further refinement, a fill material may be arranged between the first and the second material layers. The fill material can be elastic and/or be arranged only in sections between the two material layers.

The use of a fill material which can differ from the material of the material layers opens up a further degree of freedom for matching the bending stiffnesses in the three spatial directions. Moreover, this refinement facilitates the production of the novel sensor module, particularly in cases where the sensor module is assembled from two or more single-layer modules. The use of a fill material is, moreover, a very simple option for implementing a large vertical spacing between the material layers, particularly in the case of assembled "single-layer" modules.

In a further refinement, the first and the second material layers consist of different material.

This refinement offers a further degree of freedom for matching the bending stiffnesses. In particular, use of anisotropic materials and/or different dopings in the material layers render it possible to vary the mechanical properties and the bending stiffnesses in the three spatial directions.

In a further refinement, the first and the second material layers are arranged congruently one above another.

This refinement necessarily results when two individual single-layer modules, with the deformable connecting element being designed as a solid membrane, are arranged one above another. However, this refinement is also possible when the deformable connecting element comprises individual webs. The advantage of this refinement is the simple and stable mechanical design of the novel sensor module.

In a further refinement, the connecting element includes at least one first web-shaped area that forms the first material layer.

As already mentioned above, the use of web- or strip-shaped connecting elements contributes to a matching of the bending stiffnesses. The combination with the novel multi-layer design enables a particularly good matching that is well suited, in particular, for carrying out scanning measurements.

In a further refinement, the connecting element includes at least one second web-shaped area that forms the second material layer.

In this refinement, both material layers (if appropriate, all the material layers in the case of multilayer implementation) are of web-shaped design. This refinement can likewise be implemented very easily when two single-layer sensor modules having web-shaped connecting elements are arranged one above the other. A particularly good matching of the bending stiffnesses can be achieved by means of such a refinement.

In a further refinement, the first and the second web-shaped areas are arranged, parallel to the first measurement plane, offset with respect to each other.

In this refinement, the web-shaped areas are not arranged congruently one above another. This refinement is particularly advantageous when only two webs are provided in each material layer, such that a cruciform connection between the stylus support and the module base does not result until the material layers are mounted one above another, in which case the branches of the cross then lie in various planes. This refinement can be implemented easily and cost-effectively, and it enables a good matching of the bending stiffnesses in the three spatial directions.

In a further refinement, the connecting element includes at least one substantially closed membrane area that forms the second material layer.

This refinement is also particularly advantageous when the novel sensor module is assembled from a number of single-layer sensor modules. The use of a single-layer sensor module having a membrane-type connecting element enables a stable module design. In combination with a second module having web-shaped connecting elements, a further degree of freedom is offered for individually matching the bending stiffnesses. Moreover, the production of sensor modules having membrane-type connecting elements is very easy and cost-effective.

In a further refinement, the novel sensor module has at least two module parts, a first module part including the first material layer, and a second module part including the second material layer.

This refinement makes use of the option, already addressed, of assembling the novel sensor module from a number of single-layer sensor modules. The refinement enables a particularly easy and cost-effective production.

In a further refinement, the support and the module base are movably interconnected both via the first material layer and via the second material layer.

In this refinement, the at least two material layers lie parallel to one another in regard to function. Geometrically, however, the two material layers can nevertheless be set at a slant to one another. This refinement is simple in terms of production engineering and, in particular, it enables the advantageous assembly of the novel sensor module from a number of single-layer sensor modules. Moreover, in this refinement the matching of the bending stiffnesses is relatively easy and can be specified by determination.

In another refinement, the support is connected only to the first material layer, while the module base is connected only to the second material layer, and an intermediate element is provided in order to interconnect the first and the second material layers (preferably movably).

In this refinement, the at least two material layers form a multipartite joint that is advantageously designed with a meandering cross section. In other words, in this refinement the connecting element includes a multipartite joint that extends over a number of planes. This refinement is more complicated with regard to production engineering, but offers further degrees of freedom and therefore enables a particularly good matching of the bending stiffnesses.

In a further refinement, the connecting element consists of a semiconductor material. The entire sensor module is preferably produced from a semiconductor material, and the connecting element is connected in one piece to the module base and the stylus support. Furthermore, it is preferred when the structure of the sensor module is produced by etching from a solid body, wherein a number of single-layer sensor modules can be produced separately and then be interconnected via a suitable connection, for example an adhesive joint.

The use of a semiconductor material for the novel sensor module enables a particularly cost-effective production and a high level of miniaturization. Monocrystalline silicon is well suited as semiconductor material. However, other semiconductor materials may also come into consideration.

In a further refinement, the novel sensor module includes a stylus that is permanently secured to the movable stylus support.

This refinement is particularly advantageous for implementing a miniaturized sensor module, since a permanent fastening of the stylus ensures the observance of small production tolerances, and thus contributes to a high measuring accuracy.

It is self-evident that the features mentioned above and those that are still to be explained in the following text can be used not only in the respectively stated combination, but also in other combinations or on their own, without departing from the scope of the present invention.

BRIEF DESCRIPTION OF THE DRAWINGS

Exemplary embodiments of the invention are illustrated in the drawing and explained in more detail in the following description. In the drawing:

FIG. 2 shows the assembly of an exemplary embodiment of the novel sensor module from two single-layer sensor modules, FIG. 3 shows the sensor module from FIG. 2 in the assembled state, FIG. 4 shows the sensor module from FIG. 3 in a cross-sectional view.

DESCRIPTION OF PREFERRED EMBODIMENTS

Figure 1:
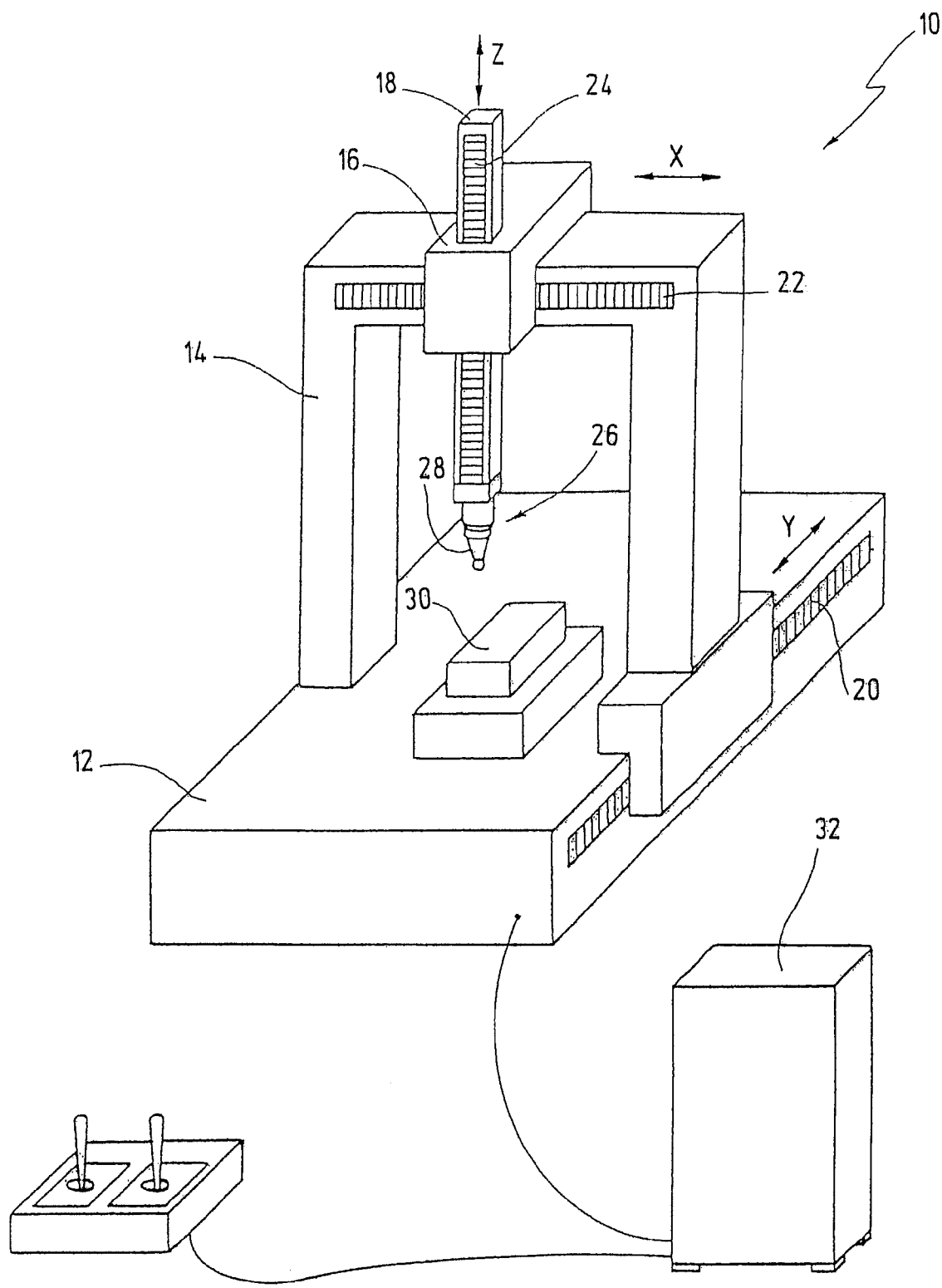
FIG. 1 shows a simplified illustration of a coordinate measuring machine, where the novel sensor module is used.

In FIG. 1, a coordinate measuring machine is denoted by reference numeral 10 in total. The coordinate measuring machine 10 is illustrated here in the form of a gantry structure which is frequently used. However, the invention is not restricted to this form. In principle, the novel sensor module can also be used with other configurations, for example for horizontal-arm measuring devices. It is particularly preferable for the novel sensor module to be used for a coordinate measuring machine as is described in US 2007/0089313 A, which is incorporated by reference. This preferred coordinate measuring machine has a movement mechanism for the probe which differs from the conventional designs and whose fundamental principles are described in a dissertation by Marc Vermeulen entitled "High Precision 3D-Coordinate Measuring Machine", which can be obtained using the ISBN number 90-386-2631-2. However, for the sake of simplicity, the following description refers to the coordinate measuring machine illustrated in FIG. 1, because its movement mechanism is clearer and more conventional.

The coordinate measuring machine 10 has a base plate 12 on which a gantry 14 is arranged such that it can be moved in a longitudinal direction. This longitudinal direction is typically referred to as the y-axis. A carriage 16 which can be moved in the x-direction and carries a quill 18 moveable in the z-direction is arranged on the upper crossbeam of the gantry 14. Reference numerals 20, 22, 24 denote scales from which the respective position of the gantry 14, of the carriage 16 and of the quill 18 can be read in the three spatial directions x, y, z. Basically, the scales 20, 22, 24 may be simple measurement scales, which are read by an operator of the coordinate measuring machine 10. However, they are preferably distance measurement transmitters that are read by machine, such as glass scales that are optically scanned.

A probe 26 is arranged at the lower free end of the quill 18 and carries a stylus 28, which is not illustrated to scale here. The stylus 28 is used to touch defined measurement points on a measurement object 30. For this purpose, the measurement object 30 is arranged on the base plate 12 of the coordinate measuring machine 10. The spatial coordinates of the measurement point touched can be determined from the position of the probe 26 in the measurement volume of the coordinate measuring machine 10, and from the deflection of the stylus 28 relative to the probe. The sensor modules described below are preferably fastened to the probe 28 by means of a probe holder such as described in US 2006/0010702 A, which is incorporated by reference.

For the sake of completeness, the coordinate measuring machine 10 is in this case illustrated with an evaluation and control unit 32 via which the measuring procedure is controlled, and which is also used for conditioning and outputting the measured values.

In FIGS. 2, 3 and 4 a first exemplary embodiment of the novel sensor module is denoted by the reference numeral 40 in total. The sensor module 40 comprises two single-layer module parts 42, 44 which are mounted on and fastened to one another (FIG. 2). Each module part 42, 44 has a module base 46a, 46b that is designed here as a square frame. Arranged inside of each frame 46a, 46b is a stylus support 48a, 48b which is sometimes denoted as "boss". Each stylus support 48a, 48b is connected to the associated frame 46a, 46b via a membrane 50a, 50b. The edge length of the frames 46a, 46b, that is to say the external dimensions of the sensor module 40, lies here between approximately 3 and 10 mm, for example at 6.5 mm. The frame 46a, 46b, the stylus support 48a, 48b and the membrane 50a, 50b are made here from a solid silicon body by an etching process. The thickness of the membrane is, for example, 0.025 mm, while the frame and the stylus support are approximately 0.5 mm thick. Owing to these geometric dimensions, the stylus support 48a, 48b can move relative to the frame 46a, 46b, with the membrane 50a, 50b being deformed.

A stylus 26 is permanently secured, for example by bonding, to the stylus support 48a of the upper module part 42. The module part 42 with the stylus 26 corresponds per se to a sensor module as is known, for example, from the prior art cited at the beginning. What is novel is that the sensor module 40 is constructed from two (or more) such module parts 42, 44 which are arranged on one another in the way illustrated in FIG. 3. It is self-evident that only the uppermost module part 42 carries a stylus 26 in this case.

The (first) measurement plane, which is defined by the module base 46a, 46b when proper use is made of the sensor module 40, is denoted by the reference numeral 54 in FIG. 3. When proper use is made of the sensor module 40, the measurement plane 54 is parallel to the x-/y-plane of the coordinate measuring machine 10.

As can be seen from the cross-sectional illustration in FIG. 4, the two module parts 42, 44 touch one another both in the area of the frames 46a, 46b and in the area of the stylus supports 48a, 48b. The membranes 50a, 50b are, by contrast, arranged at a spacing from one another that corresponds to the difference between the height D of the frame 46a, 46b and the material strength d of the membranes 50a, 50b. In this exemplary embodiment the ratio (D-d)/d determines the factor by which the bending stiffness is raised in comparison to the corresponding bending stiffness of the individual module part 42 for deflections of the stylus 26 in the x- or y-directions. By contrast, the bending stiffness of the double-layer sensor module 40 is raised by the factor 2 for deflections of the stylus in the z-direction (perpendicular to the measurement plane 54). A matching of the bending stiffnesses in the x-/y-directions and z-direction can be achieved by suitable selection of the geometric dimensions d and D.

Figure 5:
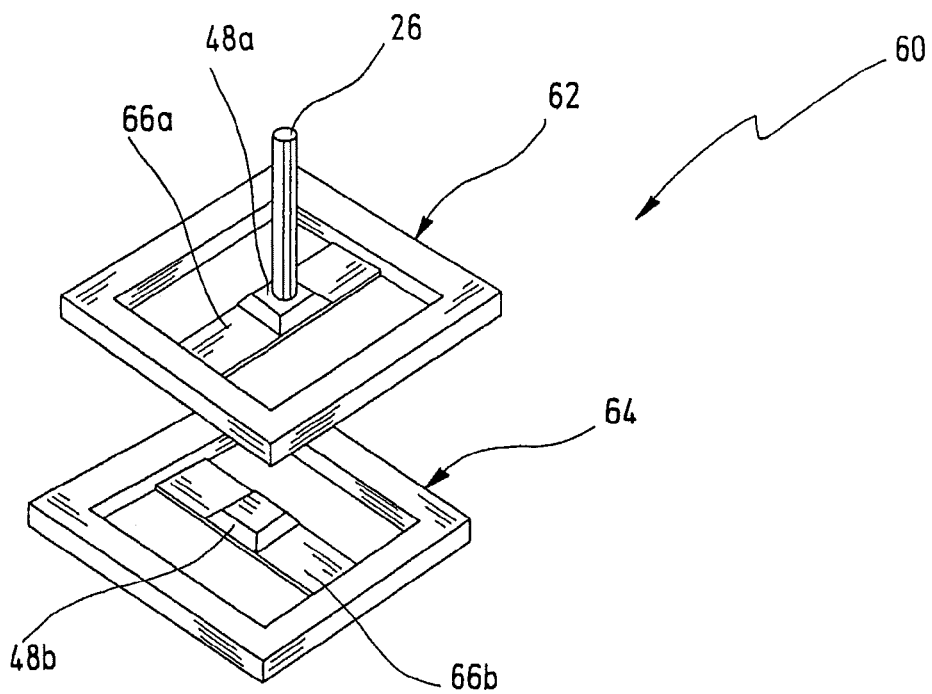
FIG. 5 shows a second exemplary embodiment of an assembled sensor module.

In FIG. 5, a second exemplary embodiment of the novel sensor module is denoted by reference numeral 60 in total. The sensor module 60 also comprises two module parts 62, 64 which are arranged one above another and secured one to another. As distinguished from the module parts 42, 44 from FIG. 2, the connecting elements here are merely strips 66a, 66b that run in the middle from one side of the frame to the other. The stylus supports 48a, 48b are designed in the middle on the strips 66a, 66b. In other words, the module parts 62, 64 differ from the module parts 42, 44 from FIG. 2 in that the connecting elements are not designed here as solid membranes. The module parts 62, 64 are "open" to the right and left of the strips 66a, 66b. As an alternative to this, the strips 66a, 66b could also be formed solely by etching a slot into the solid membrane 50a, 50b from the embodiment of FIG. 2, or introducing it in some other way. Such a solution can be implemented more easily and accurately in terms of production engineering than the removal of relatively large surface areas.

The two module parts 62, 64 are arranged on one another in the exemplary embodiment in FIG. 5 such that the strip-shaped connecting elements 66a, 66b are offset by 90° to one another. The sensor module 60 therefore has a cruciform connecting element in plan view (not illustrated here). In this case, the branches of the cross (that is to say the strips 66a, 66b) lie in different planes, as illustrated in FIG. 4 for the solid membranes.

Figure 6:
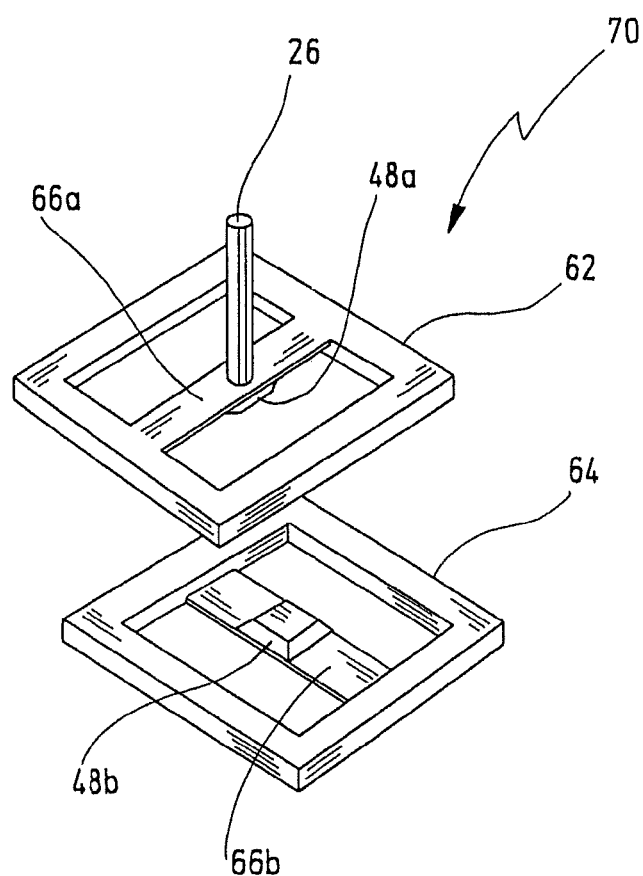
FIG. 6 shows a third exemplary embodiment of an assembled sensor module.

In FIG. 6, a further exemplary embodiment of the novel sensor module is denoted by reference numeral 70. Identical reference symbols denote the same elements as before. The sensor module 70 also comprises two single-layer module parts 62, 64. In contrast to the exemplary embodiment from FIG. 5, here the upper module part 62 is placed on the head, that is to say it is pivoted by 180° about a horizontal axis lying in the measurement plane 54. As a result, the free end faces of the stylus supports 48a, 48b lie on one another in the assembled state. The stylus 26 is fastened on the rear side of the stylus support 48a. This exemplary embodiment has the advantage that the relative spacing of the two strips 66a, 66b is enlarged, as a result of which the bending stiffness in the x-/y-directions can be more easily matched to the bending stiffness in the z-direction, for otherwise identical dimensions.

Figure 7:
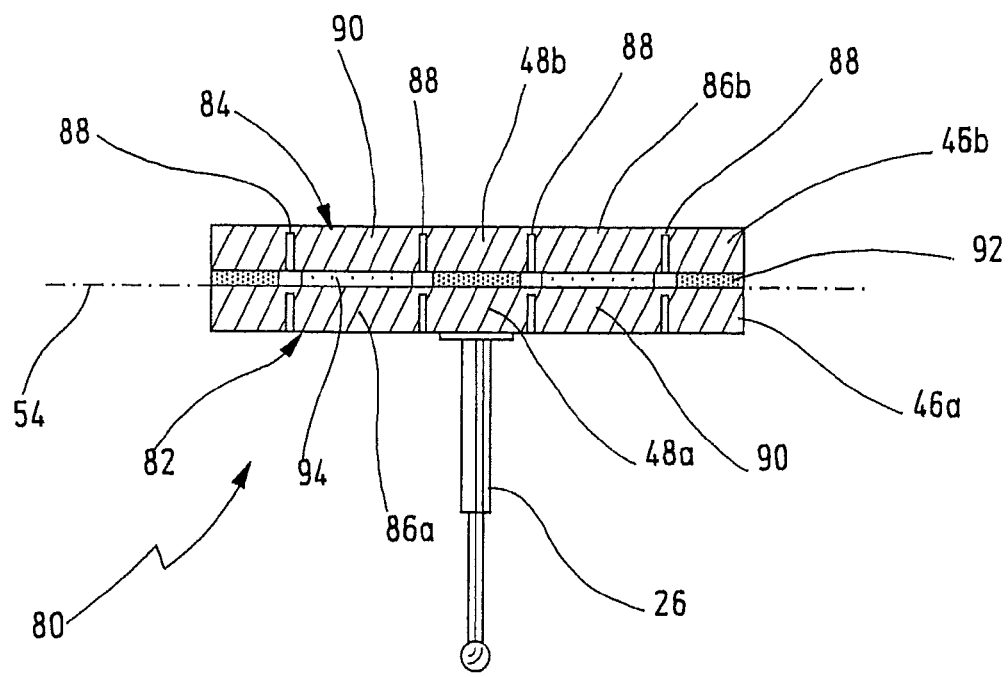
FIG. 7 shows a fourth exemplary embodiment of an assembled sensor module in a cross-sectional view.

In FIG. 7, a further exemplary embodiment of the novel sensor module is denoted by reference numeral 80. The sensor module 80 also comprises two module parts 82, 84 that are placed on and secured to one another. The deformable connecting elements 86a, 86b are designed here as web-shaped areas (similar to in the exemplary embodiments in accordance with FIG. 5 and FIG. 6), each web 86 having two thin-material sections 88 that delimit a thick-material web section 90. In other words, in profile the solid body of each module part 82 has only narrow slots that separate the frame 46 and the stylus support 48 from the web sections 90. Since the slots are not formed down to the base of the solid material, a web area 88 of lesser material thickness d remains in the area of the slots, while the web area 90 lying therebetween has approximately the same material thickness as the outer frame 46. Otherwise, the webs 86 are of cruciform design.

In this exemplary embodiment, a fill material 92 is further arranged between the module parts 82, 84. The fill material 92 connects the two module parts 82, 84 along the frame 46 and at the stylus supports 48. Moreover, a further fill material 94 can be provided between the thick-material web areas 90. The fill materials 92 and 94 can be identical and connect the two module parts 82, 84 over the entire base area, or there can be different fill materials 92, 94. Furthermore, the fill material 94 between the thick-material web areas 90 can be more elastic than the fill material 92 between the frames 46 and the stylus supports 48. An elastic fill material can, moreover, also be provided to cover the area between the two module parts 82, 84, while FIG. 7 illustrates an exemplary embodiment in which the fill materials 92, 94 are provided only in sections such that the thin-material web areas 88 are left free.

Figure 8:
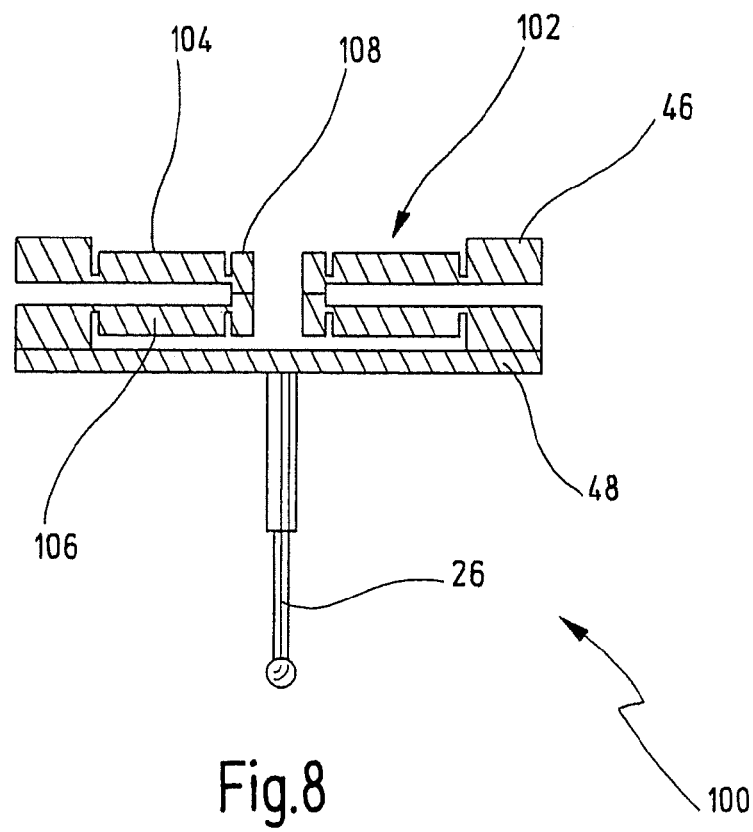
FIG. 8 shows a fifth exemplary embodiment of the novel sensor module.

In FIG. 8, a further exemplary embodiment of the novel sensor module is denoted by reference numeral 100. As in the foregoing embodiments, the sensor module 100 has a stationary frame 46 and a stylus support 48 that are interconnected via a deformable connecting element 102. However, here the stylus support 48 is not designed as "boss" in the middle of the frame 46, but as a plate that spans the entire base area of the sensor module 100. The stylus 26 is fastened in the middle on the plate.

The connecting element 102 is here a multipartite joint that extends over two planes and has a U-shaped profile in cross section. A first joint section 104 is connected to a second joint section 106 via an intermediate element 108, the joint sections 104, 106 lying one above another in an approximately parallel fashion, while the intermediate element 108 is perpendicular thereto. The end areas of the joint sections 104, 106 are designed as thin-material web areas that enable a deformation. The joint section 104 is connected to the frame 46 via a first thin-material web area. At its other end, it is connected to the intermediate element 108 via a second thin-material web area. In the same way, the joint section 106 is connected to the intermediate element 108 via a first thin-material web area, and to the plate-shaped support 48 via a second thin-material web area.

What is claimed is:

1. A sensor module for a probe of a tactile coordinate measuring machine, comprising:
    a stationary module base which defines a first measurement plane and is configured to generally define an outer dimension of the sensor module,
    a support moveable relative to the module base for holding a stylus, and
    at least one deformable connecting element located inwardly of said module base which movably interconnects the support and the module base,
    wherein the connecting element has at least a first and a second deformable material layer which, perpendicular to the first measurement plane, are arranged offset with respect to each other, and
    wherein the stylus support is solely interconnected to the module base via the at least one deformable connecting element.

2. The sensor module of claim 1, wherein the first and the second material layers are arranged with a mutual spacing from one another.

3. The sensor module of claim 1, wherein the first and the second material layers consist of different material.

4. The sensor module of claim 1, wherein the first and the second material layers are arranged congruently one above the other.

5. The sensor module of claim 1, wherein the connecting element comprises a first strip that forms the first deformable material layer.

6. The sensor module of claim 5, wherein the connecting element comprises a second strip that forms the second material layer.

7. The sensor module of claim 6, wherein the connecting element consists solely of said first and the second strips which are rotated with respect to one another so as to form a crucifix in a view from above.

8. The sensor module of claim 1, wherein the connecting element comprises at least one substantially closed membrane area which forms at least one of the material layers.

9. The sensor module of claim 1, wherein the support is connected only to the first material layer, the module base is connected only to the second material layer, and further comprising an intermediate element interconnecting the first and the second material layers.

10. The sensor module of claim 1, wherein the stylus defines an axis perpendicular to the first measurement plane and further wherein said first and second deformable material layers extend inwardly from said module base toward said axis.

11. The sensor module of claim 10, wherein the thickness of each of said first and second deformable material layers is approximately 30 μm.

12. The sensor module of claim 1, wherein the thickness of the sensor module is approximately 1 mm.

13. The sensor module of claim 1, wherein said first and second deformable material layers define first and second parallel planes offset from each other in a direction perpendicular to the first measurement plane.

14. A sensor module for a probe of a tactile coordinate measuring machine, comprising:
    a stationary module base which defines a first measurement plane,
    a support moveable relative to the module base for holding a stylus, and
    at least one deformable connecting element which movably interconnects the support and the module base,
    wherein the connecting element has at least a first and a second deformable material layer which, perpendicular to the first measurement plane, are arranged offset with respect to each other, and
    further wherein the module base, the connecting element and the support are integrally made from a semiconductor material.

15. A multilayer sensor module for a probe of a tactile coordinate measuring machine, the sensor module comprising
    at least two module parts mounted on and secured to one another, with each module part having a module base in the form of a frame and a stylus support arranged inside the frame and connected to the frame via a deformable material layer,
    wherein the two module parts are connected to one another both in the area of the frames and in the area of the stylus support,
    wherein the material layers are arranged at a mutual spacing from one another, and
    wherein each module part consists of a semiconductor material, with each material layer being integrally formed between the frame and the stylus support.

16. The sensor module of claim 15, wherein each module part is a single-layer module part having only a single deformable material layer for connecting the frame and the stylus support.

17. The sensor module of claim 15, wherein at least one material layer comprises a substantially closed membrane area.

18. The sensor module of claim 15, wherein at least one material layer is formed by a web-shaped area.

19. The sensor module of claim 15, wherein at least two material layers are formed by web-shaped areas.

20. The sensor module of claim 19, wherein the at least two material layers are arranged congruently one above another.

21. The sensor module of claim 19, wherein the at least two material layers are rotated with respect to one another so as to form a crucifix if seen from above.

22. The sensor module of claim 15, further comprising a fill material arranged between the module parts.

23. The sensor module of claim 15, wherein the material layers consist of different material.

24. The sensor module of claim 15, further comprising a stylus permanently attached to the stylus support of one of the at least two module parts.

* * * * *